US012565453B2

(12) United States Patent
Zecevic

(10) Patent No.: US 12,565,453 B2
(45) Date of Patent: Mar. 3, 2026

(54) DEVICE AND PROCEDURE FOR COOLING FRESH CONCRETE AT ELEVATED TEMPERATURES

(71) Applicant: Zeljko Zecevic, Futog (RS)

(72) Inventor: Zeljko Zecevic, Futog (RS)

( * ) Notice: Subject to any disclaimer, the term of this patent is extended or adjusted under 35 U.S.C. 154(b) by 741 days.

(21) Appl. No.: 18/039,066

(22) PCT Filed: Jul. 31, 2020

(86) PCT No.: PCT/RS2020/000010

§ 371 (c)(1),
(2) Date: May 26, 2023

(87) PCT Pub. No.: WO2021/025569

PCT Pub. Date: Feb. 11, 2021

(65) Prior Publication Data

US 2024/0002298 A1 Jan. 4, 2024

(30) Foreign Application Priority Data

Aug. 2, 2019 (RS) ................................. P-2019/1004

(51) Int. Cl.
C04B 40/00 (2006.01)
B28C 5/46 (2006.01)
C04B 28/02 (2006.01)

(52) U.S. Cl.
CPC .......... C04B 40/0075 (2013.01); B28C 5/468 (2013.01); C04B 28/02 (2013.01)

(58) Field of Classification Search
CPC ...... C04B 40/0075; C04B 28/02; B28C 5/468
See application file for complete search history.

(56) References Cited

U.S. PATENT DOCUMENTS 3,583,172 A 6/1971 Koudelka et al.
2002/0017742 A1* 2/2002 Kikuchi .................. B29C 33/36
264/333

(Continued)

FOREIGN PATENT DOCUMENTS

DE 3623723 A1 1/1988
DE 10253132 A 5/2004

(Continued)

OTHER PUBLICATIONS

Ataalla, Mina, "Cooling Concrete using Liquid Nitrogen". Retrieved from: [!https://www.linkedin.com/pulse/cooling-concrete-using-liquid-nitrogen-mina-ataalla], 9pp.

(Continued)

*Primary Examiner* — Nelson J Nieves
(74) *Attorney, Agent, or Firm* — The Roy Gross Law Firm, LLC; Roy D. Gross

(57) ABSTRACT

The device and procedure for cooling fresh concrete at elevated temperatures enable efficient cooling of fresh concrete, which is achieved by the subject device comprising of: cooling station (1) with measuring and regulating equipment (2) and safety equipment (3), solenoid valves (5), pressure transmitter (6), cryogenic shut-off valves (7), collector (17) made of stainless steel pipes with temperature probes (8), concrete mixer (9) and manometer (10) with safety valves (11).

The procedure of cooling fresh concrete using liquid nitrogen in the mixer is carried out as follows: first aggregate-separated gravel is added, then cement, then water and finally, if necessary, additives-chemical additives. Mixing of added raw materials lasts from 15-20 seconds, until a homogeneous mixture is obtained, after which liquid nitrogen is added at a pressure of 6 bar, giving cooled fresh (Continued)

concrete on which no surface cracks and fissures appear at external temperatures of 30-35° C.

2 Claims, 1 Drawing Sheet

(56) References Cited

U.S. PATENT DOCUMENTS

| | | | | | |
|---|---|---|---|---|---|
| 2010/0012258 | A1* | 1/2010 | Damm | .................... | B32B 41/00 156/99 |
| 2014/0216303 | A1* | 8/2014 | Lee | ......................... | B01F 35/91 106/638 |
| 2020/0055786 | A1* | 2/2020 | Wakayama | ........... | B28C 7/0038 |
| 2022/0194866 | A1* | 6/2022 | Brouns | ............... | C04B 40/0032 |

FOREIGN PATENT DOCUMENTS

| | | | |
|---|---|---|---|
| DE | 102015004123 | A1 | 10/2016 |
| EP | 2077933 | B1 | 2/2012 |
| EP | 3412420 | A1 | 12/2018 |
| IT | FE20 120 007 | A1 | 9/2013 |
| JP | S62122710 | A | 6/1987 |
| JP | H04126819 | U | 11/1992 |
| JP | H04130814 | U | 12/1992 |
| JP | H0763968 | B2 | 7/1995 |
| JP | H07205137 | A | 8/1995 |
| WO | 2016082030 | A1 | 6/2016 |

OTHER PUBLICATIONS

Messer Tehnogas Ad, "Hlađenje betona enje betona teĕnim azotom". Retrieved from: [https://web.archive.org/web/20160729162317/http://www.buildmagazin.com/pdf/BUILD21.pdf], 2pp.

PCT International Search Report for International Application No. PCT/RS2020/000010, mailed Jan. 18, 2021, 5pp.

PCT Written Opinion for International Application No. PCT/RS2020/000010, mailed Jan. 18, 2021, 9pp.

* cited by examiner

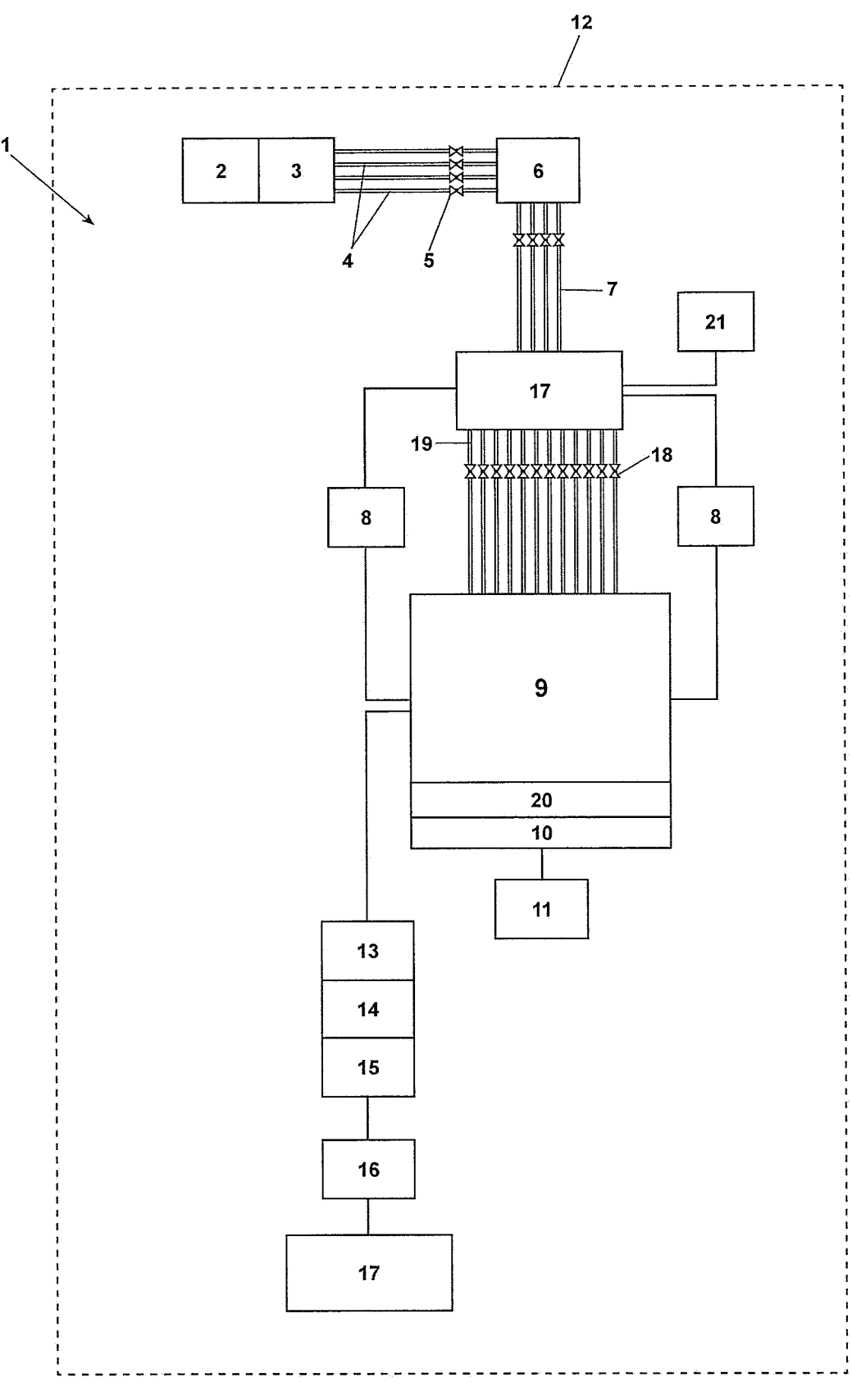

DEVICE AND PROCEDURE FOR COOLING FRESH CONCRETE AT ELEVATED TEMPERATURES

CROSS REFERENCE TO RELATED APPLICATIONS

This application is a National Phase of PCT Patent Application No. PCT/RS2020/000010 having International filing date of Jul. 31, 2020, which claims the benefit of priority of Serbian Patent Application No. P-2019/1004, filed Aug. 2, 2019, the contents of which are all incorporated herein by reference in their entirety.

TECHNICAL FIELD

The technical field covering the invention generally belongs to the field of construction, and in particular refers to a device that achieves efficient fresh concrete cooling at air temperatures higher than 30° C. which are assumed to be special concreting conditions, through a specially defined procedure.

According to the International Patent Classification (IPC) Int.cl. 2018.01, the object of the invention is classified and marked with the basic classification symbol C04B 40/00 which defines processes, in general, for influencing or modifying the properties of mortars, concrete, or artificial stone compositions, e.g. their setting or hardening ability.

As the present invention also comprises a device enabling the process in question, the invention may also be designated by the secondary classification symbol B28C 5/00 defining apparatus or methods for producing mixtures of cement with other substances, e.g. slurries, mortars, porous or fibrous compositions. Since the cooling process is controlled by specially programmed PLC devices, the invention can be indicated by another secondary classification symbol B28C 7/00 which includes controlling the operation of apparatus for producing mixtures of clay or cement with other substances; supplying or proportioning the ingredients for mixing clay or cement with other substances.

Technical Problem

The technical problem that is solved by the present invention consists in the following: how to define a device that enables the process of controlled cooling of fresh concrete mixture with liquid nitrogen to the desired temperature at the construction site, i.e. the concreting site, during the summer months, i.e. when the fresh concrete temperature is over 30° C., and even over 35° C., by lowering the concrete mixture temperature by up to 15° C., thus achieving lower capital investment, flexible cooling capacity, reduction of space for installation of equipment, controlled nitrogen consumption, reduction of cooled concrete costs by 2-4.5 Euros per cubic meter, shorter delivery time for equipment and its commissioning, and to make use of equipment, according to the invention, simple, easy to handle, use and maintain.

BACKGROUND ART

The valid PAB 87—Rules on technical norms for concrete and reinforced concrete envisage that the maximum temperature of fresh concrete that is not installed by special procedures provided for tempered concrete must not exceed 30° C. If the average daily air temperature is higher than 30° C., it is necessary to take special measures of concrete hardening prescribed and binding by these Rules. Installation of concrete at outdoor temperatures higher than 30° C. is considered to be concreting under special conditions.

The concept of elevated ambient temperatures in concreting technology, in addition to air temperatures above 30° C., implies the presence of two additional also unfavorable factors—low relative humidity and increased wind speed. All the above factors condition the following:

- the need for a larger amount of water in the concrete to ensure the required manufacturability of fresh concrete,
- fast consistency change and shortening the time of the beginning of cement setting,
- rapid water evaporation through the open surfaces of the installed concrete followed by great plastic shrinkage of the concrete,
- formation of cracks and fissures on the concrete surface, as a consequence of plastic shrinkage,
- increased hydration and hydraulic shrinkage,
- a certain decrease in the nominal (ultimate) strength and deterioration of other concrete properties, including its durability,
- the need to take a series of technological measures that will ensure getting elements and structures of the required performance.

The problems of making quality fresh concrete are especially pronounced during the summer months when the cement delivered to the concrete factory is at temperatures between 60° C. and 70° C., and the aggregates used for making fresh concrete are at temperatures between 30° C. and 35° C.

It should be borne in mind that the water used in making fresh concrete is at temperatures between 10° C. and 15° C., so mixing these components produces fresh concrete with temperature over 30° C., usually 32-33° C.

Measures and methods that are most often used today for cooling fresh concrete are realized:

- By inserting crushed ice directly into the mixer (with this method, due to the limitations and control of w-c ratio, the fresh concrete mix temperature can be lowered by a maximum of 3-4° C.;
- By cooling of cement with liquid nitrogen, as one of the components in the mixture for making fresh concrete, when the cement delivered to concrete factories is cooled by applying liquid nitrogen from tanks during the pouring of cement into cement silos. It is important to note that this procedure has a limited duration of effect. Namely, cement that is pre-cooled to the desired temperature and placed in warehouse-silos begins to heat up after a certain time, which significantly reduces the fresh concrete cooling effect. With applying this procedure, the fresh concrete mixture temperature cannot be lower than 3-4° C. below the input temperature. Note that the cost per cubic meter with the nitrogen input price of 135 Euros/t is 8-12 Euros/m³ of cooled concrete.
- By cooling the water by adding ice to the "flow" water tank, when it should also be borne in mind that this procedure serves as an auxiliary means, and in addition to the cost of providing ice and expanding production capacity, allows reducing fresh concrete mixture temperature by up to 2° C.
- By building a canopy above the aggregate boxes, ensuring that its temperature is lower by 10-15° C., which thus reduces fresh concrete temperature by up to 1.5° C.

In addition to the above methods, the auto-mixer drum insulation with "felt" is often used, which is then wetted with water, the evaporation of which lowers the drum temperature by ~10° C. With thus insulated auto-mixer, it was achieved that the prepared concrete heats up more slowly during transport due to the reduced effect of external sun rays to which the drum is otherwise directly exposed. In practice, cement storing silos are also painted white, which reduces sunlight absorption, and results in slower heating of cement in silos, and thus greater temperature flexibility of the input components.

A review of available domestic and foreign patent documentation found the following:

German application DE 3623723 A1, published on 28 Jan. 1988, shows an invention entitled "Process and apparatus for the production of fresh concrete using cement previously cooled with liquid nitrogen". According to this solution, liquid nitrogen is injected into the cement silo at the same time as the cement. In this way, good heat transfer to the components that make up the concrete is ensured, with efficient cement cooling in a simple way. This solution has its advantages, but the problem is that the cement heats up during transport, as well as during storing if not used in a short period of time after cooling.

The recognized European patent EP2077933 B1 published on Apr. 10, 2008, entitled "Method and device for the production of fresh cooled concrete", gives a method and device for the production of fresh cooled concrete by adding liquid nitrogen through the supply water to the pneumatic charger. On this occasion, the liquid nitrogen evaporates immediately after contact with the cement and the increase in pressure leads to a short-term interruption in cement transport. As a result of this process, there is periodic blowing of dust which leads to ecological problems in the environment where the concrete is cooled. The invention implies a solution according to which there are two supply lines connecting the supply silo and the mixing unit, where a part of the flow of mixing material is redirected through a cooling unit in which the concrete mixture comes into contact with cooling material and thus the cooling process occurs. Cryogenic materials are used to carry out the cooling process, e.g. nitrogen or carbon dioxide.

In the technical literature in this field, the German company Messer Group has given several descriptions of technical solutions for cooling concrete using liquid nitrogen, which are based on cooling cement during its taking into silos. Such solutions have the disadvantage that the cement must be used in a shorter period of time as high temperatures inevitably lead to its heating, and thus the problems that occur with concrete at a higher temperature than the optimal for the given conditions during installation.

DISCLOSURE OF INVENTION

The essence of the invention is reflected in that, according to the author's idea, a device is defined which achieves an efficient process of cooling fresh concrete mixture using liquid nitrogen in a mixer, comprising: a cooling station with measuring-regulating and safety equipment made of seamless stainless steel pipes AISI304L, 21.3×2.77 mm sch40S, with four solenoid valves, pressure transmitter, four manual cryogenic shut-off valves, two temperature probes for measuring the temperature of fresh concrete in the concrete mixer, manometer, four safety valves fixed to a stainless steel frame made of 50×50×2 mm boxes, control cabinet with PLC and automatic control elements, control box with display and button for remote control of the operation of concrete cooling equipment from the container where the operator is located, and collector made of seamless stainless steel pipes AISI304L, 33.4×2.77 mm sch10S, brass nozzles installed on pipes AISI304L, 21.3×2.11 mm sch10S, connectors for nozzles for injecting liquid nitrogen into the concrete mixer during the concrete mixing process.

The essence of the invention is also that the amount of liquid nitrogen for cooling fresh concrete mixture, injected directly into the mixer, is automatically controlled via the control cabinet and solenoid valves. In this way, the consumption of liquid nitrogen per cubic meter is significantly reduced and ranges from 25 to 38 kilograms per cubic meter (which is up to four times less than the consumption using conventional technologies).

The essence of the invention is also that using the devices in question achieves a reduction in the space for equipment installation, shortens the time of delivery of equipment and commissioning, simplifies the use and maintenance and significantly reduces the cost per one cubic meter of cooled fresh concrete.

The novelty of the invention is reflected in that by applying the procedure defined by the invention, the use of liquid nitrogen for cooling concrete is achieved without negative effects on consistency, workability, air content, curing time and w-c ratio in fresh concrete.

What makes this invention fundamentally different is that by using a control cabinet with PLC elements for automatic control of the production process, the concrete is cooled to the desired temperature, allowing the concrete mixture temperature to drop by up to 15° C.

Certainly, the greatest novelty of the invention is reflected in the definition of a simple procedure for cooling concrete mixture which is, according to a predetermined recipe, composition and weight/% of raw materials, after precise dosing of components, taken to the mixer in the following order: first the aggregate-separated gravel is put, followed by cement, water and finally, if necessary, additives-chemical additives. Mixing of the raw materials lasts 30-40 seconds, until a homogeneous mixture is obtained, where during this process, after 15 seconds, liquid nitrogen is injected into fresh concrete mixture through the installed nozzles via a pipeline from the liquid nitrogen tank, at a pressure of 6 bar. On this occasion, during the mixing process, the liquid nitrogen in contact with the concrete mix components evaporates and thus cools it to a given temperature, and the evaporated gaseous nitrogen and air exit through a filter at the top of the pipeline connected to the mixer. In this way, even at external temperatures of 30-35° C., cooled fresh concrete is obtained on the surface of which no cracks and fissures appear, which otherwise occur as a result of elevated concrete temperatures due to plastic shrinkage caused by rapid evaporation of water over open surfaces of installed concrete.

It is important to note that this procedure increases the speed of achieving consistency and shortens the cement setting start time.

Compared to the technical solutions known so far, the present invention has several advantages, the most significant of which are:

controlled concrete mixture cooling with controlled nitrogen consumption,
  lower capital investments,
  shorter equipment delivery and commissioning time and its simplified use and maintenance and
  reduced space for equipment installation.

BRIEF DESCRIPTION OF DRAWINGS

In order to facilitate the understanding of the invention, the author refers, only by way of example, to the attached application drawing where:

FIG. 1 presents the technological scheme of the device which enables the process of cooling fresh concrete mixture using liquid nitrogen in the mixer.

DETAILED DESCRIPTION OF THE INVENTION

It is known that concrete is basically made of three main ingredients: aggregate 70-80%, water 5-10% and cement 10-20%. Concrete hardens after mixing and installation, due to a chemical process called hydration. Water reacts with cement, which hardens and binds the other components in the mixture, which eventually results in a hard "stone" material. The term "concrete" generally means a wide range of artificial building materials of composite type obtained by agglomeration of grains of very different aggregate types. Agglomeration also involves the use of certain binders. Having in mind this definition, it follows that in principle there are gypsum concrete, lime concrete, water glass concrete, asphalt concrete and others. Certainly, the most widely used are concretes with cement used as a binder, which should formally be called cement concretes, but in practice, it is common for materials of this type to be called only concretes and are used the most of all artificial materials in the world, primarily for making roads, buildings, foundations, bridges, "stone" blocks, etc.

Knowledge and problems related to the use of fresh concrete, which are especially pronounced during the summer months when the cement delivered to the concrete factory is at a temperature between 60° and 70° C., aggregates used for the production of fresh concrete are at a temperature of 30 to 35° C., and the water used in the production of fresh concrete is at a temperature between 10° and 15° C. and lead to fresh concrete having a temperature usually up to 32-33° C. This type of concrete is considered to be of poor quality and very quickly forms surface cracks and fissures, which occur as a result of plastic shrinkage.

The solution to this problem was the basis on which the inventive idea of defining a device that enables the process of efficient fresh concrete cooling at elevated temperatures using liquid nitrogen was realized, with the device designed so that it can precisely determine lowering temperatures of concrete and control during the entire concreting process.

This is achieved by the device comprising: a cooling station 1 with measuring and regulating equipment 2 and safety equipment 3, by means of seamless stainless steel pipes 4 (AISI304L, 21.3×2.77 mm sch40 S), via four electromagnetic valves 5 connected to the pressure transmitter 6 and via four manual cryogenic shut-off valves 7 connected to the collector 17 with two temperature probes 8 for measuring fresh concrete temperature in the concrete mixer 9, and a manometer 10 with four safety valves 11. The cooling station 1 is mounted on a stainless steel frame 12 made of 50×50×2 mm boxes, the operation of which is controlled by a control cabinet 13 with PLC 14 and elements 15 for automatic control, control box 16 with display and button for remote control of the concrete cooling equipment operation from the container where the operator is located. The collector 17 made of seamless stainless steel pipes (AISI304L, 33.4×2.77 mm sch10S) is connected to the liquid nitrogen tank 21 and via brass nozzles 18 mounted on the pipes (A151304L, 21.3×2.11 mm sch10S) with connections 19 enables the injection of liquid nitrogen into the concrete mixer 9. The number of brass nozzles 18 depends on the volume of the mixer 9.

The invention device provides injection of liquid nitrogen directly into the mixer 9 after 15-20 seconds of mixing the concrete components, with the use of liquid nitrogen for cooling fresh concrete achieved without negative effects on consistency, workability, air content, curing time and w-c ratio for fresh concrete.

Nitrogen injected in this way, which is an inert gas that does not chemically react with other components in the concrete mixture during cooling, is partially released into the atmosphere without any environmentally negative effects, which is very important for the application process itself given the stricter regulations of PAB 87 and other national and international regulations that apply and are valid and binding, and according to which the fresh concrete temperature must not exceed 30° C.

The process of cooling fresh concrete using liquid nitrogen in the mixer is carried out on the device simply with flexible cooling capacity, controlled nitrogen consumption and control of concrete mixture cooling to the desired temperature as follows: first add aggregate-separated gravel is put, then cement, then water and finally, if necessary, additives-chemical additives. Mixing of added raw materials lasts 30-40 seconds, until a homogeneous mixture is obtained, and after 15-20 seconds of mixing, liquid nitrogen is injected into fresh concrete mixture via the pipeline from the liquid nitrogen tank 21, at a pressure of 6 bar, through installed nozzles, during which liquid nitrogen in contact with fresh concrete mixture evaporates and thus cools it to a given temperature, and the evaporated gaseous nitrogen and air exit through a filter 20 at the top of the pipeline connected to the mixer 9. This freshly cooled concrete mixture is transported to the installation site.

INDUSTRIAL OR OTHER APPLICATION OF THE INVENTION

According to the present invention, industrial or other way of carrying out the process of cooling fresh concrete at elevated temperatures is absolutely possible by means of the device and the parameters specified in this description.

Experts in the subject field can, without any problems, make the device and carry out the procedure for making fresh concrete, at the temperature defined by the PBAB 87 regulations, valid and binding for the field.

In accordance with the good results of experimental tests, conducted under conditions of particularly high temperatures, on the construction site of the Čortanovci-Sremski Karlovci high-speed railway, it was determined that the invention application achieves cooling of fresh concrete using liquid nitrogen without any negative effects on consistency, workability, air content and setting time.

The invention claimed is:

1. A device for cooling fresh concrete at elevated temperatures, comprising:

a cooling station (1) having measuring and regulating equipment (2) and safety equipment (3), the cooling station (1) connected to a pressure transmitter (6) by means of seamless stainless steel pipes (4), and four solenoid valves (S), the pressure transmitter connected to a collector (17) via four manual cryogenic shut-off valves (7), the collector having two temperature probes (8) for measuring a temperature of fresh concrete in concrete mixers (9) with filter (20), manometer (10) and four safety valves (11), the cooling station (1) being fixed to a stainless steel frame (12) made of boxes, and a control cabinet (13) containing PLC (14) and elements (15) for automatic control, and a control box (16) having a display with a button for remote control of operation of concrete cooling equipment from the control cabinet (13), wherein the collector (17) is made of seamless stainless steel pipes connected to a liquid nitrogen tank (21) with brass nozzles (18) installed on pipes with connectors (19).

2. A method for cooling fresh concrete at elevated temperatures, comprising:

adding into a mixer, aggregate-separated gravel, followed by cement, water and additives-chemical additives in given and accurately measured mass percentages;

mixing the raw materials in the mixer, whereby after 15 seconds of mixing, liquid nitrogen is added by a pipeline at a pressure of 6 bar into the mixer;

mixing the raw materials for a total of 30-40 seconds, until a homogeneous mixture is obtained;

cooling the mixture to the required temperature; and transporting the mixture to a construction site.

\* \* \* \* \*